United States Patent
Palanki et al.

(10) Patent No.: US 9,167,504 B2
(45) Date of Patent: Oct. 20, 2015

(54) INTER-TECHNOLOGY HANDOFF

(75) Inventors: Ravi Palanki, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1924 days.

(21) Appl. No.: 11/949,397

(22) Filed: Dec. 3, 2007

(65) Prior Publication Data

US 2008/0176568 A1    Jul. 24, 2008

Related U.S. Application Data

(60) Provisional application No. 60/868,528, filed on Dec. 4, 2006.

(51) Int. Cl.
*H04W 36/14* (2009.01)
*H04W 48/08* (2009.01)
*H04W 48/16* (2009.01)
*H04W 88/10* (2009.01)

(52) U.S. Cl.
CPC .............. *H04W 48/08* (2013.01); *H04W 36/14* (2013.01); *H04W 48/16* (2013.01); *H04W 88/10* (2013.01)

(58) Field of Classification Search
CPC ..... H04W 36/14; H04W 88/10; H04W 48/16; H04W 48/08

USPC ............... 455/436, 456.2, 453, 437; 370/338, 370/350, 341, 331
See application file for complete search history.

(56) References Cited

U.S. PATENT DOCUMENTS

| | | | |
|---|---|---|---|
| 2003/0119550 A1* | 6/2003 | Rinne et al. ................... | 455/553 |
| 2004/0082356 A1* | 4/2004 | Walton et al. ................. | 455/522 |
| 2004/0097230 A1* | 5/2004 | Natarajan et al. ............. | 455/436 |
| 2005/0105589 A1* | 5/2005 | Sung et al. .................... | 375/130 |
| 2005/0170783 A1* | 8/2005 | Krishnan et al. ........... | 455/67.11 |
| 2006/0073831 A1* | 4/2006 | Guyot et al. .................. | 455/443 |

* cited by examiner

*Primary Examiner* — Ariel Balaoing
(74) *Attorney, Agent, or Firm* — Darren M. Simon

(57) ABSTRACT

Systems and methodologies are described that facilitate effectuating inter-technology handoffs utilizing pilots. A sector can utilize a first technology to communicate on a first bandwidth. Further, to indicate presence of the first technology, the sector can transmit a pilot on a second bandwidth (e.g., where the second bandwidth can be utilized with a second technology). While a mobile device is communicating data utilizing the second technology upon the second bandwidth, the pilot related to the first technology can be obtained. Based upon the pilot, communication of data (e.g., received and/or transmitted by the mobile device) can be switched to using the first technology on the first bandwidth. Accordingly, the mobile device need not discontinue communicating data with the second technology prior to identifying availability of the first technology and/or initiating handoff to the first technology.

44 Claims, 10 Drawing Sheets

INTER-TECHNOLOGY HANDOFF

CROSS-REFERENCE TO RELATED APPLICATIONS

This application claims the benefit of U.S. Provisional Patent application Ser. No. 60/868,528 entitled "BEACONS FOR INTER-TECHNOLOGY HANDOFF" which was filed Dec. 4, 2006. The entirety of the aforementioned application is herein incorporated by reference.

BACKGROUND

1. Field

The following description relates generally to wireless communications, and more particularly to utilizing pilots to handoff between differing technologies in a wireless communication system.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Handoffs commonly occur within wireless communication systems. For instance, handoffs can occur between base stations and/or base station sectors. According to another illustration, wireless communication systems can support inter-technology handoffs where a mobile device switches from utilizing a first access technology to employing a second access technology. A mobile device typically effectuates an inter-technology handoff by tuning away from a frequency bandwidth associated with the first access technology and then searching for other available access technologies; hence, the mobile device ceases communicating via the first access technology and attempts to identify disparate accessible access technologies. By halting the initial connection, latencies associated with searching for and connecting via the target access technology can result in disruptions perceivable by users.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating effectuation of inter-technology handoffs utilizing pilots. A sector can utilize a first technology to communicate on a first bandwidth. Further, to indicate presence of the first technology, the sector can transmit a pilot on a second bandwidth (e.g., where the second bandwidth can be utilized with a second technology). While a mobile device is communicating data utilizing the second technology upon the second bandwidth, the pilot related to the first technology can be obtained. Based upon the pilot, communication of data (e.g., received and/or transmitted by the mobile device) can be switched to using the first technology on the first bandwidth. Accordingly, the mobile device need not discontinue communicating data with the second technology prior to identifying availability of the first technology and/or initiating handoff to the first technology.

According to related aspects, a method that facilitates indicating availability of an access technology to a mobile device is described herein. The method can include operating a sector using a first technology on a first frequency. Further, the method can comprise transmitting a pilot on a second frequency, the pilot indicates presence of the first technology.

Another aspect relates to a wireless communications apparatus. The wireless communications apparatus can include a memory that retains instructions related to operating a sector utilizing a first technology on a first frequency and sending a pilot on a second frequency utilizing a second technology, the pilot indicates presence of the first technology. Further, the wireless communications apparatus can include a processor, coupled to the memory, configured to execute the instructions retained in the memory.

Yet another aspect relates to a wireless communications apparatus that enables providing pilots to allow a mobile device to effectuate an inter-technology handoff in a wireless communication environment. The wireless communications apparatus can include means for operating a sector utilizing a first technology on a first bandwidth. Further, the wireless communications apparatus can comprise means for sending a pilot on a second bandwidth, the pilot indicates presence of the first technology. Moreover, the wireless communications apparatus can include means for communicating with a mobile device on the first bandwidth via the first technology based on the pilot.

Still another aspect relates to a machine-readable medium having stored thereon machine-executable instructions for operating a sector utilizing a first technology on a first bandwidth; sending a pilot on a second bandwidth via employing a second technology, the pilot indicates availability of the first technology; and communicating with a mobile device on the first bandwidth via the first technology based on the pilot.

In accordance with another aspect, an apparatus in a wireless communication system can include a processor, wherein the processor can be configured to operate a sector using a first technology on a first frequency. Moreover, the processor can be configured to transfer a pilot on a second frequency, the pilot indicates presence of the first technology.

According to other aspects, a method that facilitates handing off between access technologies in a wireless communication environment is described herein. The method can include communicating data on a first frequency via a first technology. Further, the method can comprise receiving a pilot on the first frequency that indicates availability of a second technology. Moreover, the method can include handing off to the second technology based on the pilot. The method can also include communicating data on a second frequency via the second technology.

Yet another aspect relates to a wireless communications apparatus that can include a memory that retains instructions related to communicating data on a first frequency utilizing a first technology, obtaining a pilot on the first frequency that indicates availability of a second technology, and transitioning to communicating data on a second frequency utilizing the second technology. Further, the wireless communications apparatus can comprise a processor, coupled to the memory, configured to execute the instructions retained in the memory.

Another aspect relates to a wireless communications apparatus that enables handing off from a first technology to a second technology in a wireless communication environment. The wireless communications apparatus can include means for communicating data on a first bandwidth via a first technology. Moreover, the wireless communications apparatus can include means for obtaining a pilot on the first bandwidth via the first technology, the pilot indicates availability of a second technology. Further, the wireless communications apparatus can include means for switching to communication of data on a second bandwidth via the second technology based on the pilot.

Still another aspect relates to a machine-readable medium having stored thereon machine-executable instructions for communicating data on a first bandwidth via a first technology, receiving a pilot on the first bandwidth via the first technology, the pilot indicates availability of a second technology, and handing off communication of data on a second bandwidth via the second technology based on the pilot.

In accordance with another aspect, an apparatus in a wireless communication system can include a processor, wherein the processor can be configured to communicate data on a first frequency via a first technology. Further, the processor can be configured to receive a pilot on the first frequency that indicates availability of a second technology prior to termination of data communication on the first frequency via the first technology. Moreover, the processor can be configured to handoff to the second technology based on the pilot. The processor can additionally be configured to communicate data on a second frequency via the second technology.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
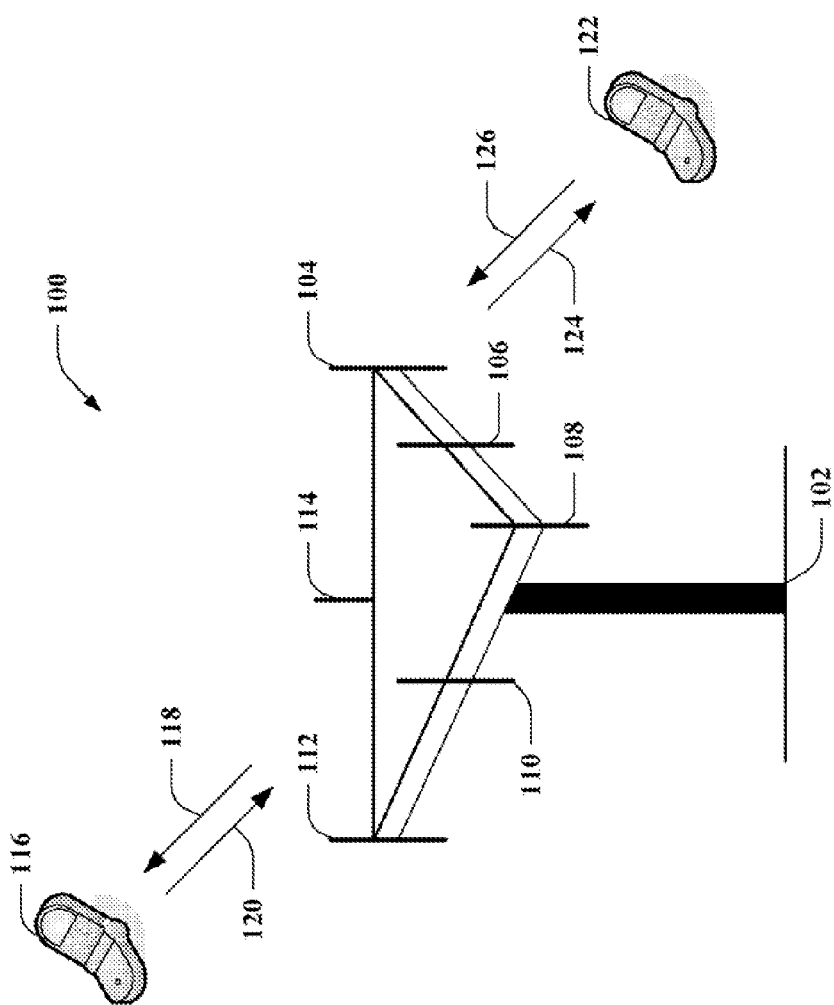
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, ...). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting—Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

Figure 2:
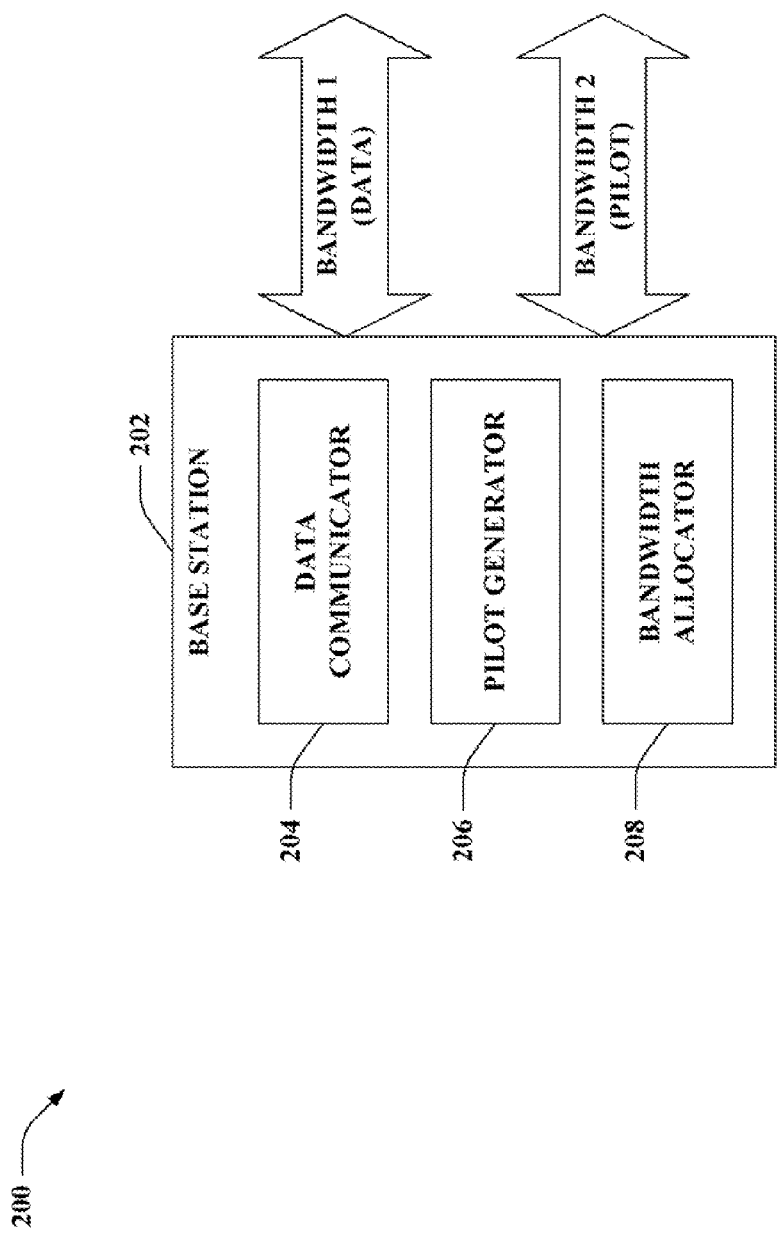
FIG. 2 is an illustration of an example system that enables inter-technology handoff within a wireless communication environment.

With reference to FIG. 2, illustrated is a system 200 that enables inter-technology handoff within a wireless communication environment. For instance, system 200 can support inter-cell handoffs and/or intra-cell handoffs. System 200 includes a base station 202 that can communicate with one or more mobile devices (not shown). Moreover, base station 202 can communicate with other base station(s) and/or any disparate devices (e.g., servers) (not shown) that can perform functions such as, for example, authentication, authorization, accounting, billing, and so forth.

Base station 202 can further include a data communicator 204, a pilot generator 206, and a bandwidth allocator 208. Data communicator 204 can enable base station 202 to transmit data to and/or receive data from one or more mobile device(s) (e.g., via the uplink and/or downlink). Moreover, data communicator 204 can leverage a first technology for transferring such data between base station 202 and mobile device(s). The first technology can be, for example, CDMA, TDMA, FDMA, OFDM, and so forth.

Pilot generator 206 can yield a pilot indicative of the first technology. The pilot can be, for example, a beacon or a sequence of beacons; however, the claimed subject matter is not so limited. Further, pilot generator 206 can incorporate various information into the pilot. By way of illustration, such information can relate to base station 202 (e.g., base station identifier, . . . ), a sector of base station 202 (e.g., SectorID, . . . ), the first technology (e.g., identify the type of technology, . . . ), a frequency bandwidth upon which the first technology is employed (e.g., CarrierIndex, . . . ), any information used to effectuate handing off to the first technology, and so forth. Moreover, the pilot transmitted by pilot generator 206 can enable a receiving mobile device to effectuate an inter-technology handoff (e.g., the mobile device can switch to transferring data to and/or from base station 202 via data communicator 204 by utilizing the first technology). For instance, pilot generator 206 can periodically transmit the pilot(s) that relate to the first technology; however, it is to be appreciated that the pilot(s) can be sent at random times, at times determined as a function of an identity (e.g., identity of base station 202, the sector, the first technology, . . . ), and so forth.

Bandwidth allocator 208 can control a bandwidth over which data is transferred to and/or from data communicator 204 and/or a bandwidth upon which the pilot yielded by pilot generator 206 is transmitted. Pursuant to an example, bandwidth allocator 208 can assign a first bandwidth for utilization by data communicator 204; thus, the first bandwidth can be employed for communicating data when leveraging the first technology. Moreover, bandwidth allocator 208 can allot a second bandwidth to be utilized by pilot generator 206 for sending the pilot(s) to enable inter-technology handoff. For instance, bandwidth allocator 208 can control the bandwidth utilized by pilot generator 206 to target mobile device(s) that employ a particular disparate second technology (e.g., the mobile device(s) can initially be operating upon the second frequency bandwidth utilizing the second technology); thus, pilot allocator 208 can recognize the bandwidth associated with the second technology and assign such bandwidth to be employed by pilot generator 206 (e.g., pilot generator 206 can send a pilot upon the assigned bandwidth using the second technology). According to another example, bandwidth allocator 208 can allocate more than one bandwidth to pilot generator 206, and thereafter, pilot generator 208 can transfer a pilot upon each of the bandwidths.

Pilot generator 206 and bandwidth allocator 208 can operate in conjunction to yield other technology pilots (e.g., beacons). The other technology pilots can include information about a location of a preamble or synch channel of the technology represented by the pilot. This information can be useful to minimize search time during inter-technology handoff. For instance, other technology pilots can be placed at certain locations (e.g., distances) with regards to the preamble or synch channel, where the locations (e.g., distances) can be fixed, a function of all or some elements of the pilot payload (e.g., SectorID, CarrierIndex, . . . ), explicitly signaled through the pilot payload, and so forth.

Figure 3:
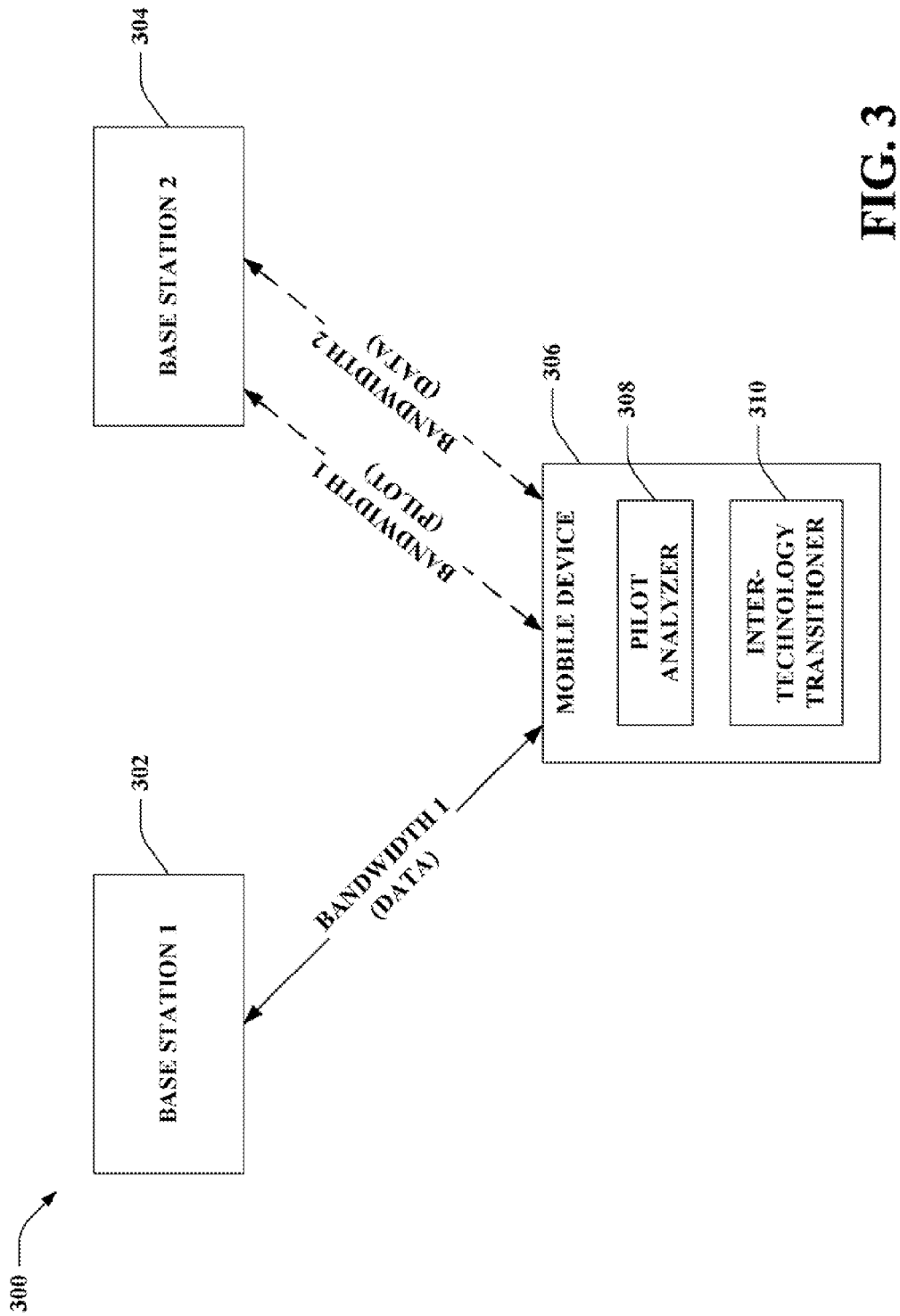
FIG. 3 is an illustration of an example system that utilizes pilots to indicate presence of a particular technology supported by a base station (and/or base station sector).

Now referring to FIG. 3, illustrated is a system 300 that utilizes pilots to indicate presence of a particular technology supported by a base station (and/or base station sector). System 300 can include a base station 1 302 and a base station 2 304; however, it is contemplated that system 300 can include any number of base stations similar to base stations 302-304. Each base station 302-304 can be substantially similar to base station 202 of FIG. 2. Moreover, system 300 includes a mobile device 306; although one mobile device 306 is shown, it is to be appreciated that any number of mobile devices can be included in system 300.

Mobile device 306 can further include a pilot analyzer 308 and an inter-technology transitioner 310. Pilot analyzer 308 can identify pilot(s) pertaining to a disparate technology received in a frequency band utilized to communicate via a first technology. Moreover, pilot analyzer 308 can evaluate the obtained pilot(s) and determine information associated with the disparate technology; for instance, the information can be encoded in the pilot(s). Pilot analyzer 308 can also determine whether to handoff to the disparate technology. Further, if a plurality of disparate technologies are identified (e.g., more than one pilot associated with more than one technology are obtained and evaluated by pilot analyzer 308), pilot analyzer 308 can select to effectuate a handoff to a particular one of the technologies. For instance, pilot analyzer 308 can select to handoff based upon an amount of bandwidth associated with each technology, signal strength, cell capacity, interference, and so forth. Moreover, pilot analyzer 308 can recognize an available technology and decide to handoff to that technology prior to mobile device 306 discontinuing communication to base station 1 302 over the first bandwidth via the first technology. In contrast, conventional technologies typically stop communication via the first technology and then initiate searching for other available technologies, which can cause latencies.

Upon selecting to handoff to the disparate technology, inter-technology transitioner 310 can effectuate discontinuing communication via the first technology and initiating communication via the second technology. For instance, inter-technology transitioner 310 can utilize information decoded by pilot analyzer 308 (e.g., information obtained from the analysis of the pilot(s), . . . ) to handoff to the second technology. The information, for example, can relate to a bandwidth to employ for the second technology, an identity of a base station and/or base station sector with which mobile device 306 is to communicate, and the like. Thus, according to an illustration, inter-technology transitioner 310 can terminate communication via the first technology over the first bandwidth, obtain parameters utilized for communicating data via the second technology, and initiate a connection via the second technology using the parameters and/or information included in the analyzed pilot(s); hence, inter-technology transitioner 310 need not search for the second technology subsequent to terminating communication via the first technology.

According to an illustration, mobile device 306 can be connected to base station 1 302; thus, data can traverse between mobile device 306 and base station 1 302 upon a first bandwidth via employing a first technology. Base station 2 304 can transmit a pilot on the first bandwidth, where the pilot can identify a second technology that can be utilized by mobile device 306. The pilot can be communicated utilizing the first technology; thus, if the first technology utilized by base station 1 302 is OFDM and the second technology used by base station 2 304 is CDMA, the pilot related to CDMA generated by base station 2 304 can be an OFDM beacon (and/or sequence of OFDM beacons), for example (e.g., base station 2 304 can generate an OFDM pilot although OFDM need not be an available technology supported by base station 2 304). Pilot analyzer 308 can evaluate the received pilot from base station 2 304 (and/or any disparate pilot(s) related to disparate technologies) and determine whether to handoff to the second technology. Thereafter, inter-technology transitioner 310 can handoff to the second technology; as such, mobile device 306 can communicate data with base station 2 304 on a second bandwidth by utilizing the second technology.

Pursuant to another example, a common base station and/or sector can support multiple technologies (not shown). Thus, the common base station and/or sector can communicate with mobile device 306 to transfer data over the first bandwidth by employing the first technology. The common base station and/or sector can also transmit a pilot related to the second technology on the first bandwidth. Mobile device 306 can obtain the pilot and handoff to the second technology as a function of the received pilot. Thus, the common base station and/or sector can communicate with mobile device 306 via the second technology on a second bandwidth.

Figure 4:
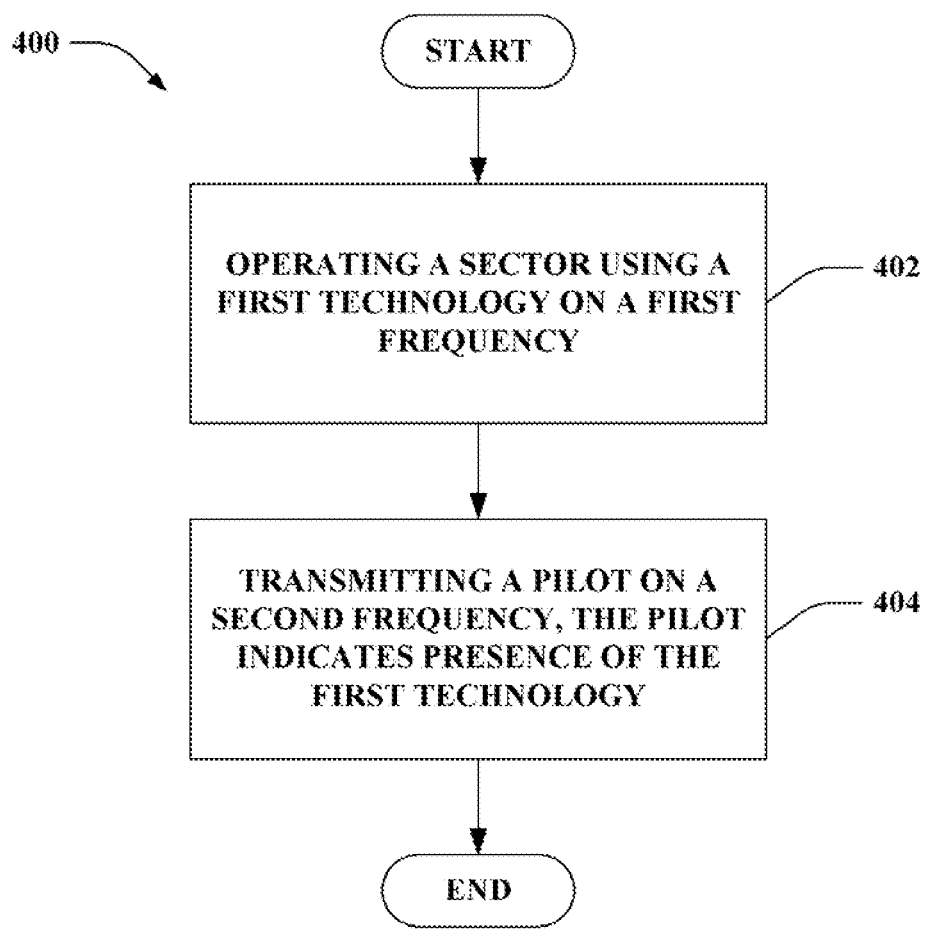
FIG. 4 is an illustration of an example methodology that facilitates indicating availability of an access technology to a mobile device.
Figure 5:
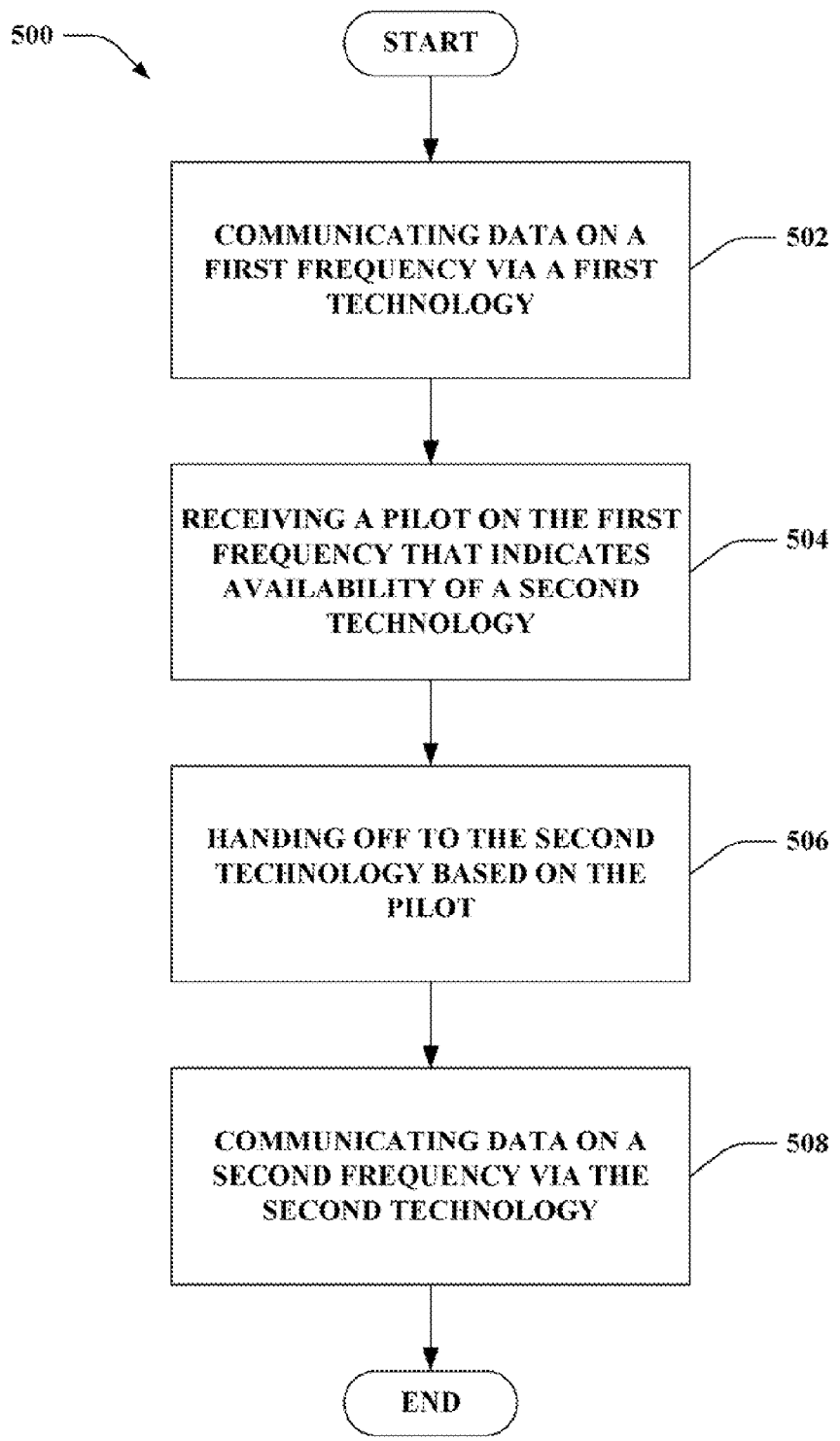
FIG. 5 is an illustration of an example methodology that facilitates handing off between access technologies in a wireless communication environment.

Referring to FIGS. 4-5, methodologies relating to utilizing pilot(s) to enable inter-technology handoffs in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that facilitates indicating availability of an access technology to a mobile device. At 402, a sector can operate using a first technology on a first frequency. It is contemplated that the first technology can be, for example, CDMA, TDMA, FDMA, OFDM, and so forth. At 404, a pilot can be transmitted on a second frequency, where the pilot can indicate presence of the first technology. According to an illustration, the pilot can be a beacon. Pursuant to another example, the pilot can be a sequence of beacons. Additionally, the pilot can include information related to a base station (e.g., base station identifier, . . . ), a sector of a base station (e.g., SectorID, . . . ), the first technology (e.g., identify the type of technology, . . . ), the first frequency upon which the first technology is employed (e.g., CarrierIndex, . . . ), any information used to effectuate handing off to the first technology, and so forth. Moreover, the pilot can be communicated by utilizing a second technology associated with the second frequency. Further, the sector can communicate with a mobile device utilizing the first technology on the first frequency in response to transmitting the pilot (e.g., the handoff can be mobile device initiated and/or base station initiated). It is contemplated that any number of pilots can be transferred from the sector upon any number of frequency bands to enable revealing the availability of the first technology to mobile devices operating by using any number of disparate technologies. Thus, by way of illustration, a second pilot can be transmitted utilizing a third technology on a third frequency, where the second pilot can indicate presence of the first technology (e.g., the indication can be provided to mobile device(s) communicating via the third technology on the third frequency).

Turning to FIG. 5, illustrated is a methodology 500 that facilitates handing off between access technologies in a wireless communication environment. At 502, data can be communicated on a first frequency via a first technology. At 504, a pilot can be received on the first frequency that indicates availability of a second technology. The pilot can be obtained from a base station and/or sector with which the data is communicated via the first technology, for example. According to another illustration, the pilot can be obtained from a disparate base station and/or sector (e.g., a base station and/or sector other than the base station and/or sector with which the data is communicated via the first technology). Further, it is to be appreciated that any number of pilots corresponding to any number of disparate technologies can be obtained (e.g. from any number of base stations and/or sectors). At 506, a handoff can be effectuated to the second technology based on the pilot. For example, the second technology can be selected based upon an analysis of the obtained pilot(s). Moreover, parameters associated with the second technology can be retrieved and utilized to transition to employing the second technology; for instance, at least a portion of the parameters can be provided with the pilot. At 508, data can be communicated on a second frequency via the second technology.

It will be appreciated that, in accordance with one or more aspects described herein, inferences can be made regarding utilizing pilots to enable inter-technology handoffs. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting frequency bands upon which to transmit pilots. By way of further illustration, an inference can be made related to determining which technology to select when a plurality of technologies are available. It will be appreciated that the foregoing examples are illustrative in nature and are not intended to limit the number of inferences that can be made or the manner in which such inferences are made in conjunction with the various embodiments and/or methods described herein.

Figure 6:
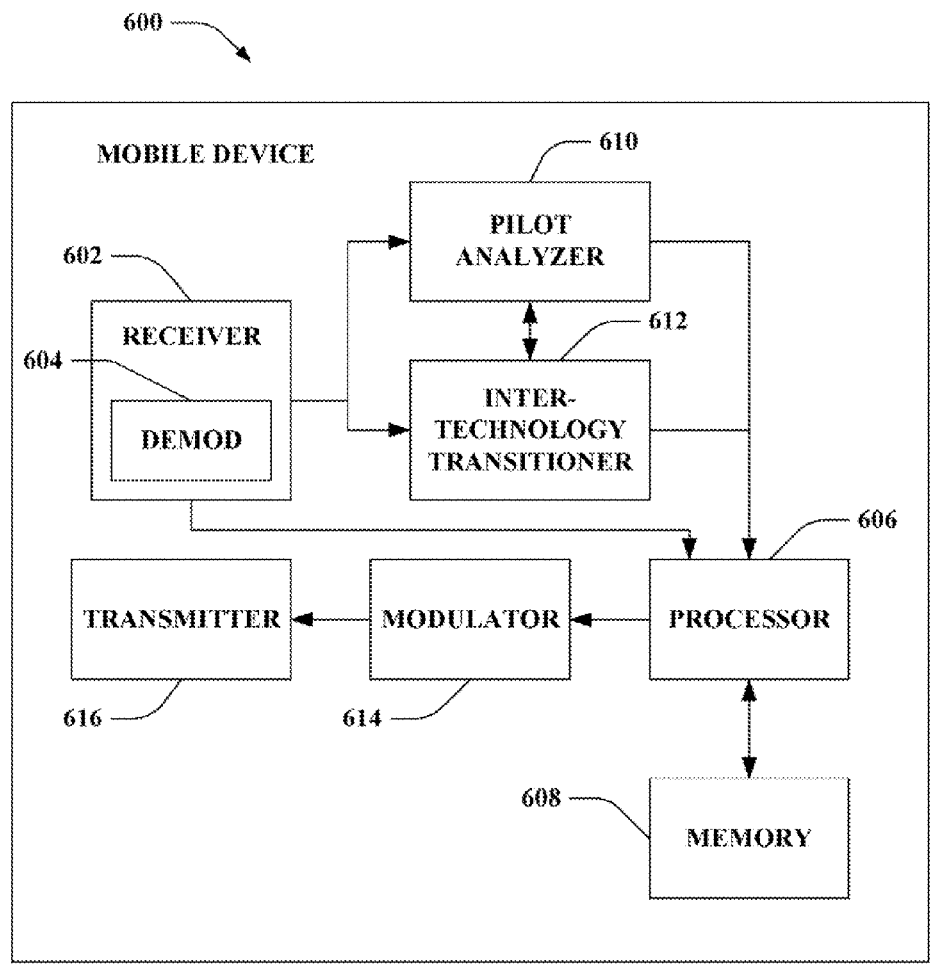
FIG. 6 is an illustration of an example mobile device that facilitates utilizing pilot(s) to handoff between technologies in a wireless communication system.

FIG. 6 is an illustration of a mobile device 600 that facilitates utilizing pilot(s) to handoff between technologies in a wireless communication system. Mobile device 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available technologies, data associated with analyzed pilots, and any other suitable information for selecting whether to effectuate an inter-technology handoff. Memory 608 can additionally store protocols and/or algorithms associated with identifying available technologies and/or handing off to such technologies.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Receiver 602 is further operatively coupled to a pilot analyzer 610 that evaluates pilot(s) obtained by receiver 602. Pilot analyzer 610 can identify available technologies while mobile device 600 utilizes a disparate technology for communication. Thus, pursuant to an example, mobile device 600 need not terminate communication via the disparate technology while pilot analyzer 610 recognizes other technologies that are accessible. Moreover, pilot analyzer 610 can perform an analysis to determine whether to handoff between technologies (e.g., select to switch to a technology identified by pilot analyzer 610 as being available). Additionally, an inter-technology transitioner 612 can effectuate the handoff. For instance, inter-technology transitioner 612 can discontinue communicating via a first technology and initialize communicating via a second technology (e.g., the technology identified and selected by pilot analyzer 610). Mobile device 600 still further comprises a modulator 614 and a transmitter 616 that transmits the signal to, for instance, a base station, another mobile device, etc. Although depicted as being separate from the processor 606, it is to be appreciated that pilot analyzer 610, inter-technology transitioner 612 and/or modulator 614 can be part of processor 606 or a number of processors (not shown).

Figure 7:
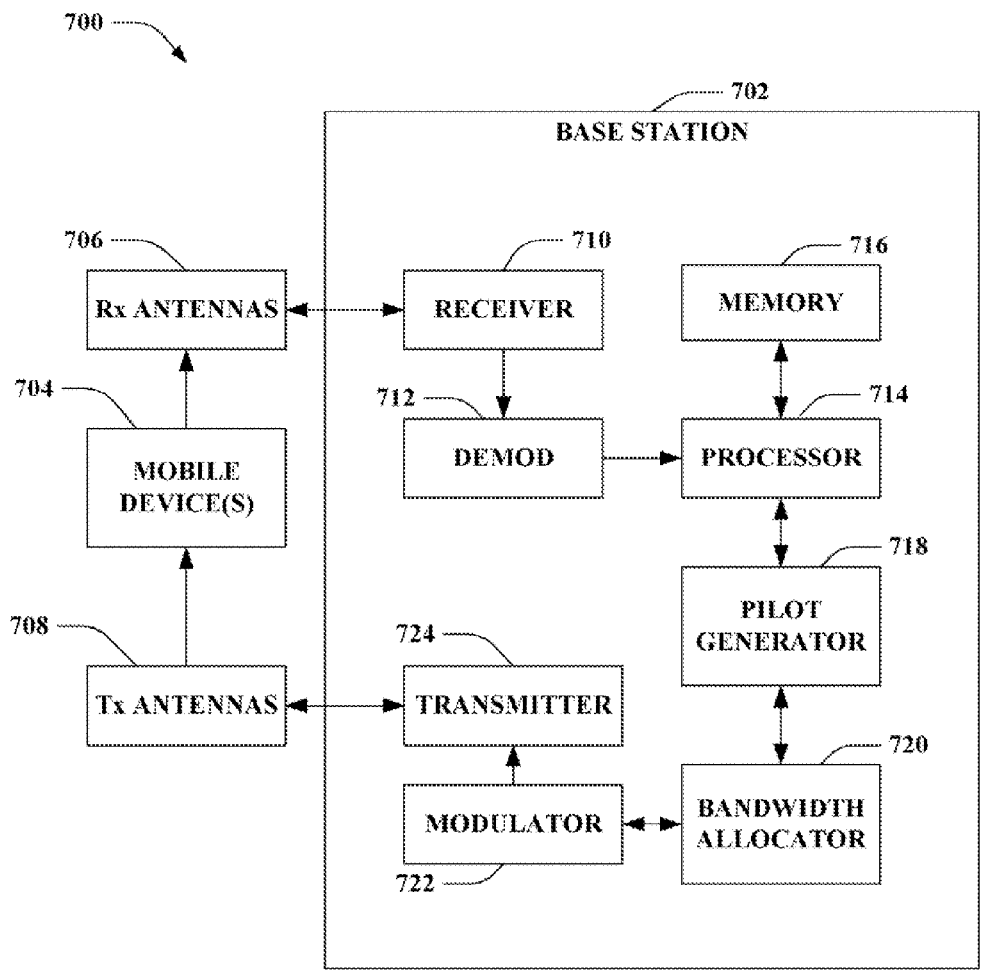
FIG. 7 is an illustration of an example system that facilitates generating a pilot that indicates presence of a technology in a wireless communication environment.

FIG. 7 is an illustration of a system 700 that facilitates generating a pilot that indicates presence of a technology in a wireless communication environment. System 700 comprises a base station 702 (e.g., access point, . . . ) with a receiver 710 that receives signal(s) from one or more mobile devices 704 through a plurality of receive antennas 706, and a transmitter 722 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to generating pilot(s), data to be transmitted to or received from mobile device(s) 704 (or a disparate base station (not shown)), and/or any other suitable information related to performing the various actions and functions set forth herein. Processor 714 is further coupled to a pilot generator 718 that constructs pilot(s) that can be sent to mobile device(s) 704 to indicate availability of a technology supported by base station 702. Base station 702 can utilize a first technology for communicating; moreover, pilot generator 718 can yield pilot(s) that can be sent to mobile device(s) 704 (e.g., which can be utilizing a second technology) to signal that the first technology is available.

Pilot generator 718 can be operatively coupled to a bandwidth allocator 720 that assigns a frequency band to pilot(s) yielded by pilot generator 718. For example, bandwidth allocator 720 can select the frequency band based upon information stored in memory 716 (e.g., the frequency band can be selected as a function of the second technology employed by one or more mobile device(s) 704). Further, bandwidth allocator 720 (and/or pilot generator 718) can provide the pilot(s) to a modulator 722. Modulator 722 can multiplex the pilot(s) for transmission by a transmitter 726 through antenna 708 to mobile device(s) 704. Although depicted as being separate from the processor 714, it is to be appreciated that pilot generator 718, bandwidth allocator 720 and/or modulator 722 can be part of processor 714 or a number of processors (not shown).

Figure 8:
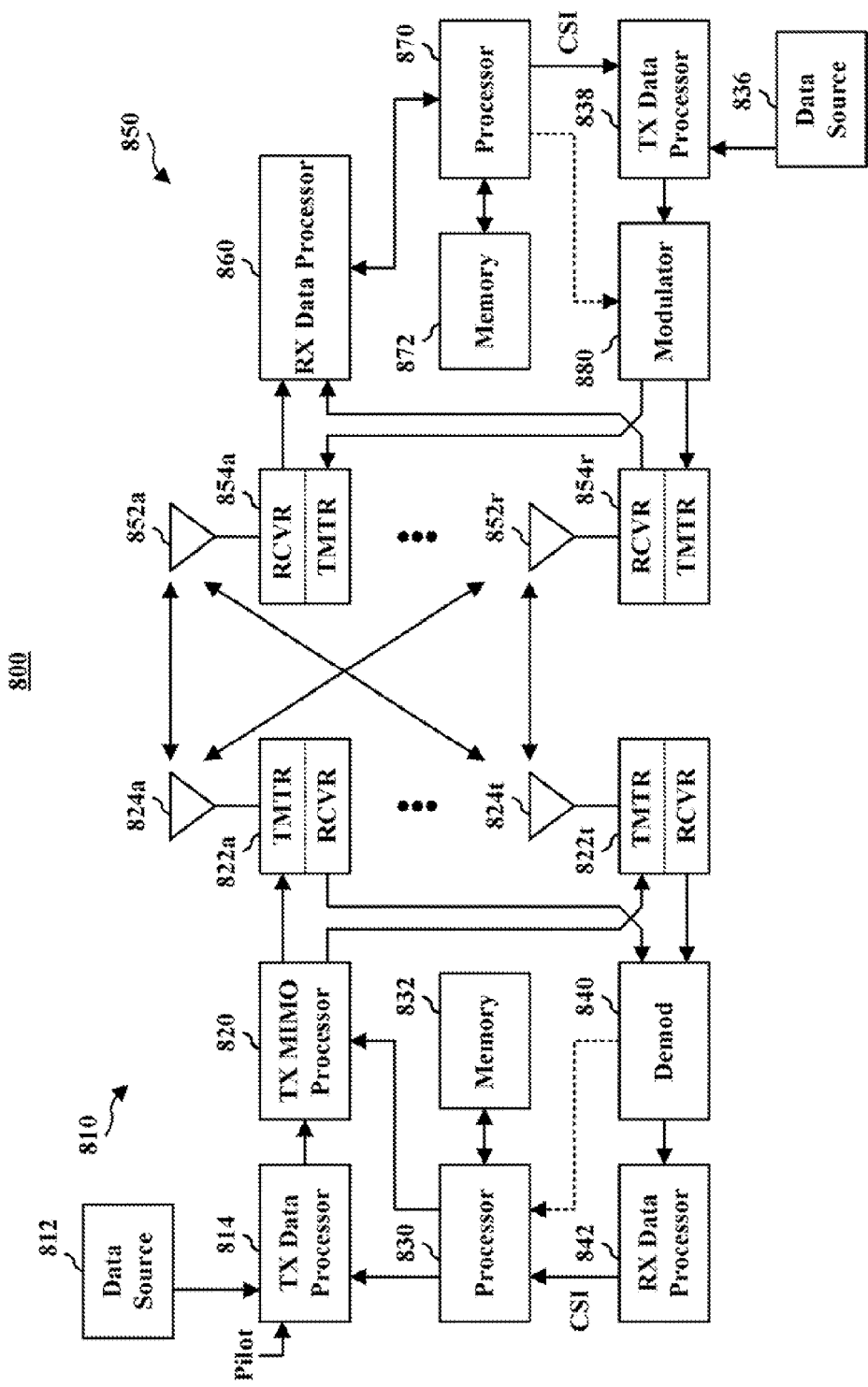
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3, 6-7, and 9-10) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
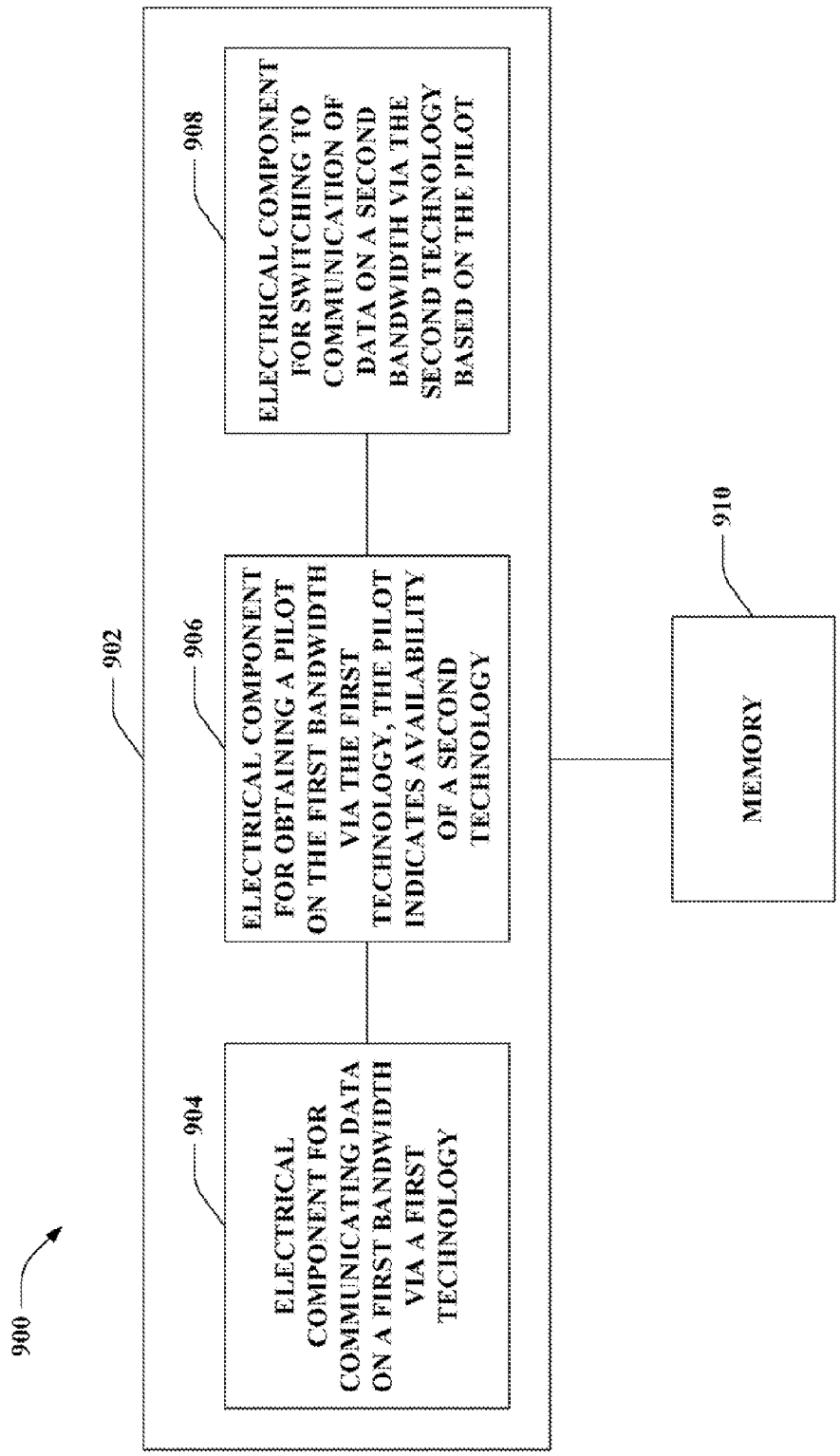
FIG. 9 is an illustration of an example system that enables handing off from a first technology to a second technology in a wireless communication environment.

With reference to FIG. 9, illustrated is a system 900 that enables handing off from a first technology to a second technology in a wireless communication environment. For example, system 900 can reside at least partially within a mobile device. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for communicating data on a first bandwidth via a first technology 904. Further, logical grouping 902 can comprise an electrical component for obtaining a pilot on the first bandwidth via the first technology, where the pilot can indicate availability of a second technology 906. For example, any number of additional pilots identifying any number of technologies can also be obtained. Moreover, logical grouping 902 can include an electrical component for switching to communication of data on a second bandwidth via the second technology based on the pilot 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
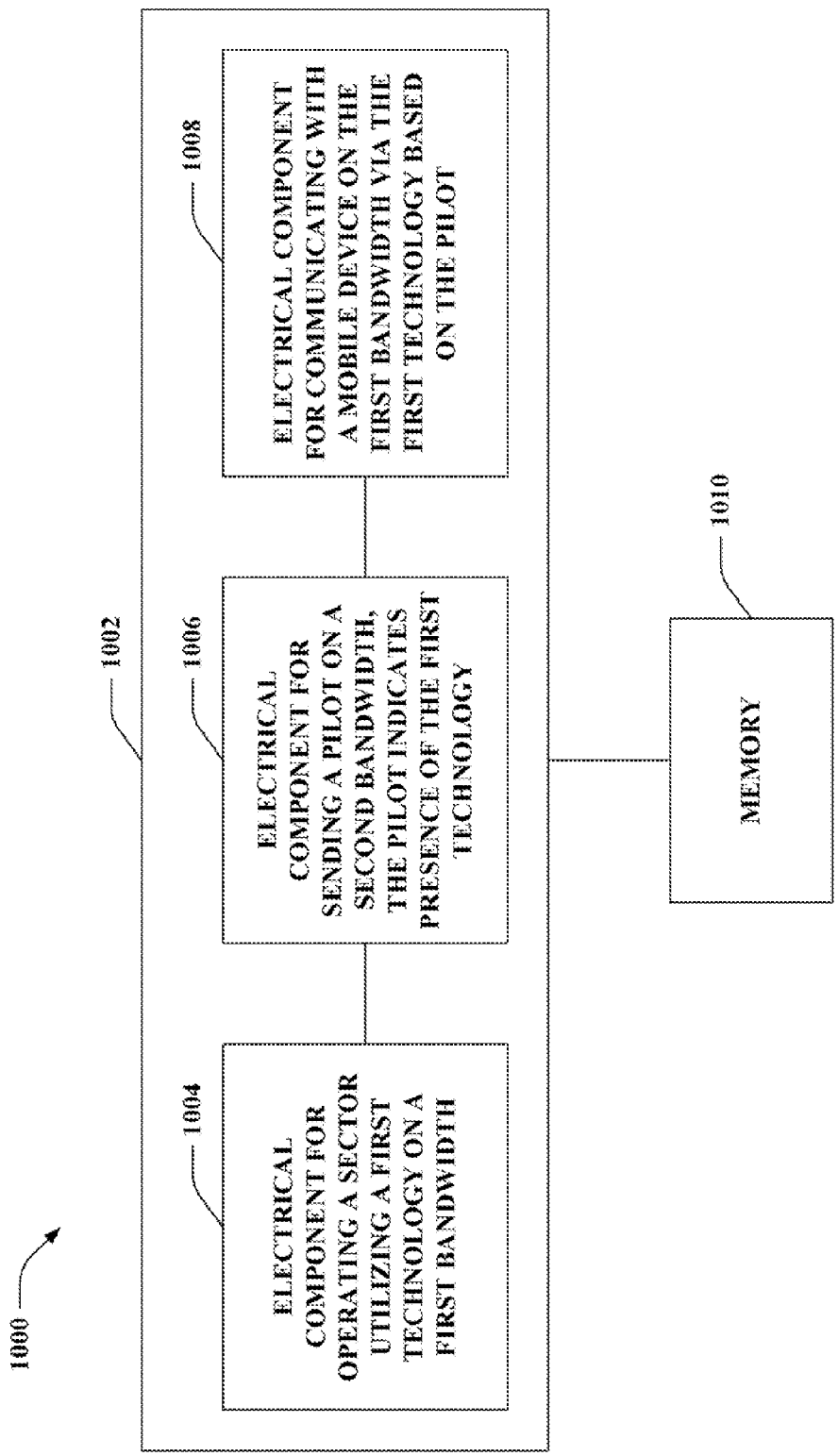
FIG. 10 is an illustration of an example system that enables providing pilots to allow a mobile device to effectuate an inter-technology handoff in a wireless communication environment.

Turning to FIG. 10, illustrated is a system 1000 that enables providing pilots to allow a mobile device to effectuate an inter-technology handoff in a wireless communication environment. System 1000 can reside within a base station, for instance. As depicted, system 1000 includes functional blocks that can represent functions implemented by a processor, software, or combination thereof (e.g., firmware). System 1000 includes a logical grouping 1002 of electrical components that can act in conjunction. Logical grouping 1002 can include an electrical component for operating a sector utilizing a first technology on a first bandwidth 1004. Moreover, logical grouping 1002 can include an electrical component for sending a pilot on a second bandwidth, where the pilot can indicate presence of the first technology 1006. For example, various information can be incorporated in the pilot (e.g., SectorID, CarrierIndex, . . . ). Further, logical grouping 1002 can include an electrical component for communicating with a mobile device on the first bandwidth via the first technology based on the pilot 1008. Additionally, system 1000 can include a memory 1010 that retains instructions for executing functions associated with electrical components 1004, 1006, and 1008. While shown as being external to memory 1010, it is to be understood that electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method that facilitates indicating availability of an access technology to a mobile device, comprising:
    operating a sector by a base station using a first technology on a first frequency;
    obtaining information indicating one or more disparate technologies used by the mobile device;
    transmitting, to the mobile device, a first pilot comprising a sequence of beacons from the base station utilizing a second technology on a second frequency, wherein the second frequency is different from the first frequency, the second technology is selected from the one or more disparate technologies and operates on the second frequency, and the first pilot indicates presence of the first technology; and
    contemporaneously transmitting a second pilot utilizing a third technology selected from the one or more disparate technologies on a third frequency, wherein the second pilot indicates presence of the first technology.

2. The method of claim 1, wherein the first pilot includes information related to one or more of a SectorID that identifies the sector and a CarrierIndex that indicates the first frequency.

3. The method of claim 1, wherein the first pilot includes information related to a location of at least one of a preamble or a synch channel associated with the first technology, the location being at least one of fixed, a function of disparate information included in a payload of the first pilot, or explicitly signaled.

4. The method of claim 1, further comprising communicating with the mobile device utilizing the first technology on the first frequency in response to the transmitted first pilot.

5. The method of claim 4, wherein the mobile device switches from utilizing the second technology to utilizing the first technology after identifying presence of the first technology from the first pilot.

6. A wireless communications apparatus, comprising:
    a memory that retains instructions related to:
        operating a sector by a base station utilizing a first technology on a first frequency;
        obtaining information indicating one or more disparate technologies used by a mobile device;
        sending, to the mobile device, a first pilot comprising a sequence of beacons from the base station on a second frequency utilizing a second technology, wherein the second frequency is different from the first frequency, the second technology is selected from the one or more disparate technologies and operates on the second frequency, and the first pilot indicates presence of the first technology; and
        contemporaneously sending a second pilot utilizing a third technology selected from the one or more disparate technologies on a third frequency, wherein the second pilot indicates presence of the first technology; and
    a processor, coupled to the memory, configured to execute the instructions retained in the memory.

7. The wireless communications apparatus of claim 6, wherein the first pilot includes information related to one or more of a SectorID that identifies the sector and a CarrierIndex that identifies the first frequency.

8. The wireless communications apparatus of claim 6, wherein the first pilot includes information related to a distance from at least one of a preamble or a synch channel related to the first technology, the distance being at least one of fixed, a function of disparate information included in a payload of the first pilot, or explicitly signaled.

9. The wireless communications apparatus of claim 6, wherein the memory further retains instructions related to communicating with the mobile device employing the first technology on the first frequency based on the first pilot.

10. A wireless communications apparatus that enables providing pilots to allow a mobile device to effectuate an inter-technology handoff in a wireless communication environment, comprising:
    means for operating a sector by a base station utilizing a first technology on a first bandwidth;
    means for obtaining information indicating one or more disparate technologies used by the mobile device;
    means for sending, to the mobile device, a first pilot comprising a sequence of beacons from the base station utilizing a second technology on a second bandwidth, wherein the second bandwidth is different from the first bandwidth, the second technology is selected from the one or more disparate technologies and operates on the second bandwidth, and the first pilot indicates presence of the first technology;
    means for contemporaneously sending a second pilot on a third bandwidth via employing a third technology selected from the one or more disparate technologies, wherein the second pilot indicates presence of the first technology; and
    means for communicating with the mobile device on the first bandwidth via the first technology based on the first pilot and the second pilot.

11. The wireless communications apparatus of claim 10, wherein the first pilot includes information related to one or more of a SectorID that identifies the sector and a CarrierIndex that indicates the first bandwidth.

12. The wireless communications apparatus of claim 10, wherein the first pilot includes information related to a distance from one or more of a preamble or a synch channel related to the first technology, the distance being at least one of fixed, a function of disparate information included in a payload of the first pilot, or explicitly signaled.

13. A non-transitory machine-readable medium having stored thereon machine-executable instructions for:
    operating a sector by a base station utilizing a first technology on a first bandwidth;
    obtaining information indicating one or more disparate technologies used by a mobile device;
    sending, to the mobile device, a first pilot comprising a sequence of beacons from the base station on a second bandwidth via employing a second technology, wherein the second bandwidth is different from the first bandwidth, the second technology is selected from the one or more disparate technologies and operates on the second bandwidth, and the pilot indicates availability of the first technology;

contemporaneously sending a second pilot utilizing a third technology selected from the one or more disparate technologies on a third bandwidth, wherein the second pilot indicates availability of the first technology; and communicating with a mobile device on the first bandwidth via the first technology based on the first pilot and the second pilot.

14. The non-transitory machine-readable medium of claim 13, wherein the first pilot includes information related to one or more of a SectorID that identifies the sector and a CarrierIndex that indicates the first bandwidth.

15. The non-transitory machine-readable medium of claim 13, wherein the first pilot includes information related to a location of at least one of a preamble or a synch channel associated with the first technology.

16. In a wireless communications system, an apparatus comprising:
a processor configured to:
operate a sector by a base station using a first technology on a first frequency;
obtain information indicating one or more disparate technologies used by a mobile device;
transmit, to the mobile device, a first pilot comprising a sequence of beacons from the base station on a second frequency using a second technology, wherein the second frequency is different from the first frequency, the second technology is selected from the one or more disparate technologies and operates on the second frequency, and the first pilot indicates presence of the first technology; and
contemporaneously send a second pilot utilizing a third technology selected from the one or more disparate technologies on a third bandwidth, wherein the second pilot indicates availability of the first technology.

17. A method that facilitates handing off between access technologies in a wireless communication environment, comprising:
communicating data with a base station by a mobile device on a first frequency via a first technology, wherein the base station is configured to obtain information indicating one or more disparate technologies used by the mobile device;
contemporaneously receiving, from the base station, a plurality of pilots corresponding to the one or more disparate technologies used by the mobile devices
receiving, from the plurality of pilots, a pilot comprising a sequence of beacons from a sector of the base station with which data is communicated on the first frequency via the first technology, wherein the pilot indicates availability of a second technology selected from the one or more disparate technologies and operating on a second frequency different from the first frequency;
handing off to the second technology based on the pilot; and
communicating data on the second frequency via the second technology.

18. The method of claim 17, further comprising receiving the pilot from a disparate sector other than a sector with which data is communicated on the first frequency via the first technology.

19. The method of claim 17, further comprising analyzing the received pilot to recognize availability of the second technology prior to discontinuing communication on the first frequency via the first technology.

20. The method of claim 17, wherein the pilot includes information related to one or more of a SectorID that identifies a sector that sent the pilot and a CarrierIndex that identifies the second frequency.

21. A wireless communications apparatus, comprising:
a memory that retains instructions related to:
communicating data with a base station on a first frequency utilizing a first technology, wherein the base station is configured to obtain information indicating one or more disparate technologies used by the wireless communications apparatus;
contemporaneously obtaining, from the base station, a plurality of pilots including the pilot corresponding to the one or more disparate technologies used by the wireless communications apparatus;
obtaining, from the plurality of pilots, a pilot comprising a sequence of beacons from a sector of the base station with which data is communicated on the first frequency utilizing the first technology, wherein the pilot indicates availability of a second technology selected from the one or more disparate technologies and operating on a second frequency different from the first frequency; and
transitioning to communicating data on the second frequency utilizing the second technology based on the pilot; and
a processor, coupled to the memory, configured to execute the instructions retained in the memory.

22. The wireless communications apparatus of claim 21, wherein the memory further retains instructions related to obtaining the pilot from a disparate sector other than a sector with which data is communicated on the first frequency utilizing the first technology.

23. The wireless communications apparatus of claim 21, wherein the memory further retains instructions related to recognizing availability of the second technology via obtaining the pilot prior to terminating communication of data on the first frequency utilizing the first technology.

24. The wireless communications apparatus of claim 21, wherein the pilot includes information related to one or more of a SectorID that identifies a sector that sent the pilot and a CarrierIndex that identifies the second frequency.

25. A wireless communications apparatus that enables handing off from a first technology to a second technology in a wireless communication environment, comprising:
means for communicating data with a base station on a first bandwidth via a first technology, wherein the base station is configured to obtain information indicating one or more disparate technologies used by the mobile device;
means for contemporaneously obtaining, from the base station, a plurality of pilots on the first bandwidth, the plurality of pilots corresponding to the one or more disparate technologies used by the wireless communications apparatus;
means for obtaining, from the plurality of pilots, a pilot comprising a sequence of beacons on the first bandwidth via the first technology, the pilot indicates availability of a second technology selected from the one or more disparate technologies and operating on a second bandwidth different from the first bandwidth; and
means for switching to communication of data on the second bandwidth via the second technology based on the pilot.

26. The wireless communications apparatus of claim 25, further comprising means for obtaining the pilot from a sector that supports communication via the first technology.

27. The wireless communications apparatus of claim 25, further comprising means for obtaining the pilot from a disparate sector other than a sector that supports communication via the first technology.

28. The wireless communications apparatus of claim 25, further comprising means for identifying availability of the second technology prior to discontinuing data communication on the first bandwidth via the first technology.

29. The wireless communications apparatus of claim 25, wherein the pilot includes information related to one or more of a SectorID that identifies a sector that sent the pilot and a CarrierIndex that identifies the second bandwidth.

30. A non-transitory machine-readable medium having stored thereon machine-executable instructions for:
communicating data with a base station by a mobile device on a first bandwidth via a first technology, wherein the base station is configured to obtain information indicating one or more disparate technologies used by the mobile device;
contemporaneously obtaining, from the base station, a plurality of pilots on the first bandwidth, the plurality of pilots corresponding to the one or more disparate technologies used by the wireless communications apparatus;
receiving, from the plurality of pilots, a pilot comprising a sequence of beacons from the base station on the first bandwidth via the first technology, wherein the pilot indicates availability of a second technology selected from the one or more disparate technologies and operating on a second bandwidth different from the first bandwidth; and
handing off communication of data on the second bandwidth via the second technology based on the pilot.

31. The non-transitory machine-readable medium of claim 30, the machine-executable instructions further comprise receiving the pilot from a sector that supports communication via the first technology.

32. The non-transitory machine-readable medium of claim 30, the machine-executable instructions further comprise receiving the pilot from a disparate sector other than a sector that supports communication via the first technology.

33. The non-transitory machine-readable medium of claim 30, the machine-executable instructions further comprise selecting to handoff to the second technology rather than remaining disparate technologies identified in the one or more disparate technologies as being available.

34. The non-transitory machine-readable medium of claim 30, the machine-executable instructions further comprise identifying availability of the second technology prior to discontinuing data communication on the first bandwidth via the first technology.

35. The non-transitory machine-readable medium of claim 30, wherein the pilot includes information related to one or more of a SectorID that identifies a sector that sent the pilot and a CarrierIndex that identifies the second bandwidth.

36. In a wireless communications system, an apparatus comprising:
a processor configured to:
communicate data with a base station on a first frequency via a first technology, wherein the base station is configured to obtain information indicating one or more disparate technologies used by the mobile device;
contemporaneously obtain, from the base station, a plurality of pilots on the first bandwidth, the plurality of pilots corresponding to the one or more disparate technologies used by the wireless communications apparatus;
receive, from the plurality of pilots, a pilot comprising a sequence of beacons from the base station on the first frequency via the first technology prior to termination of data communication on the first frequency via the first technology, wherein the pilot indicates availability of a second technology selected from the one or more disparate technologies and operating on a second frequency different from the first frequency;
handoff to the second technology based on the pilot; and
communicate data on the second frequency via the second technology.

37. The method of claim 1, wherein transmitting the sequence of beacons further comprises transmitting an Orthogonal Frequency Division Multiplexing (OFDM) symbol.

38. The method of claim 1, wherein the first pilot is transmitted at times based on a function of at least one identity associated with the first technology.

39. The wireless communication apparatus of claim 6, wherein transmitting the sequence of beacons further comprises transmitting an Orthogonal Frequency Division Multiplexing (OFDM) symbol.

40. The wireless communication apparatus of claim 6, wherein the first pilot is transmitted at times based on a function of at least one identity associated with the first technology.

41. The method of claim 17, wherein transmitting the sequence of beacons from a sector of the base station further comprises transmitting an Orthogonal Frequency Division Multiplexing (OFDM) symbol.

42. The method of claim 17, wherein the pilot is transmitted at times based on a function of at least one identity associated with the first technology.

43. The wireless communication apparatus of claim 21, wherein transmitting the sequence of beacons from a sector of the base station further comprises transmitting an Orthogonal Frequency Division Multiplexing (OFDM) symbol.

44. The wireless communication apparatus of claim 21, wherein the pilot is transmitted at times based on a function of at least one identity associated with the first technology.

* * * * *